UNITED STATES PATENT OFFICE.

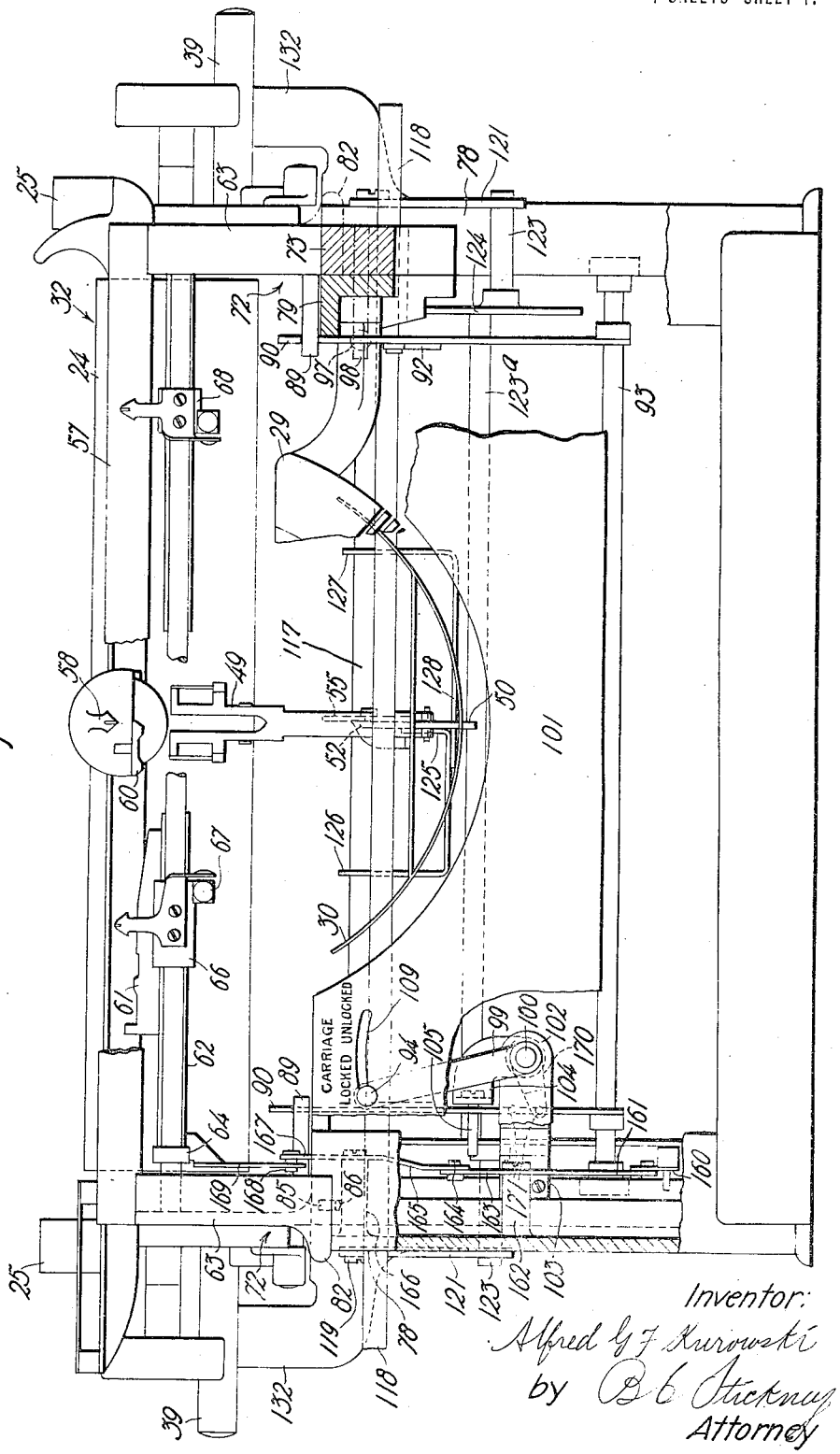

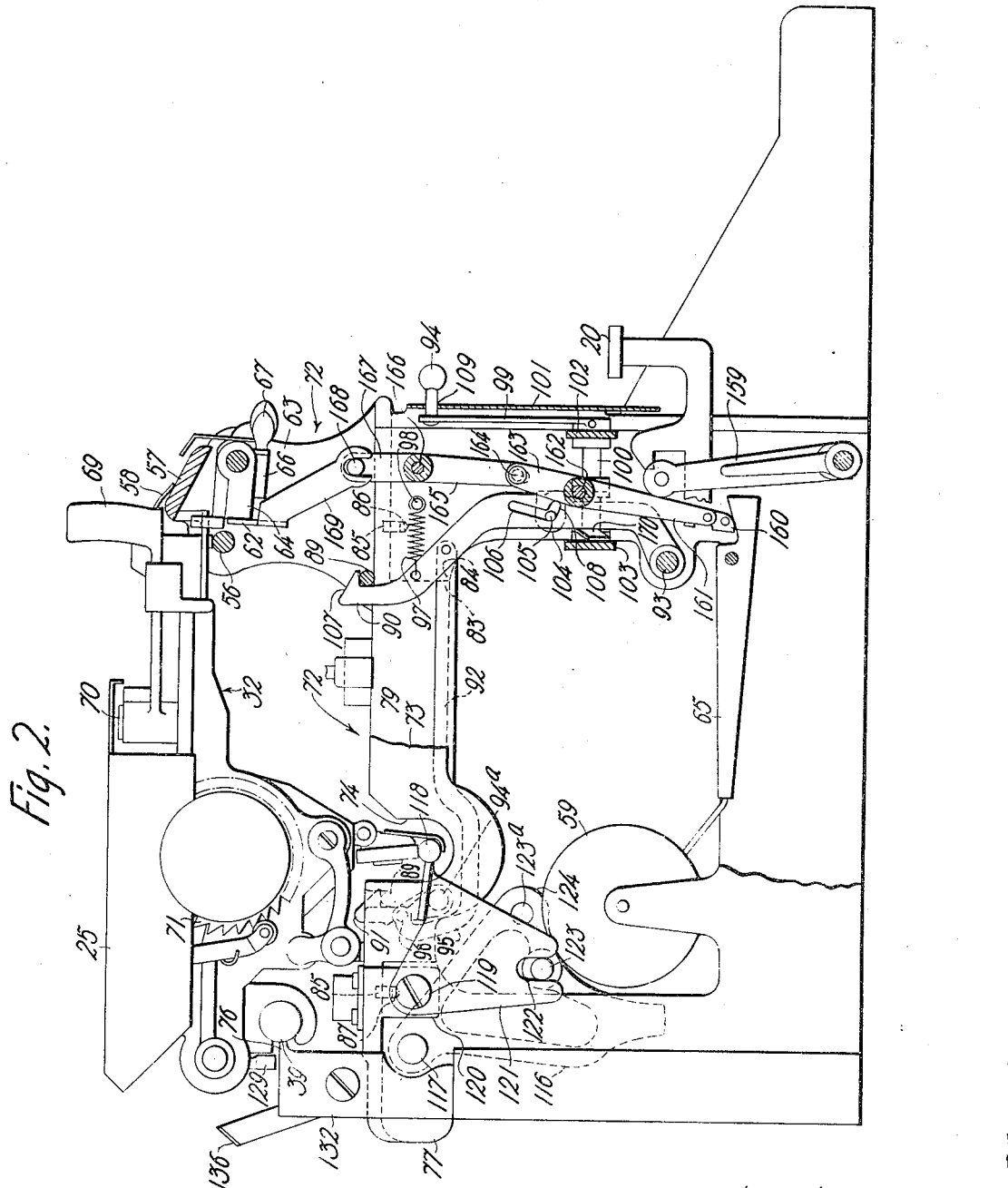

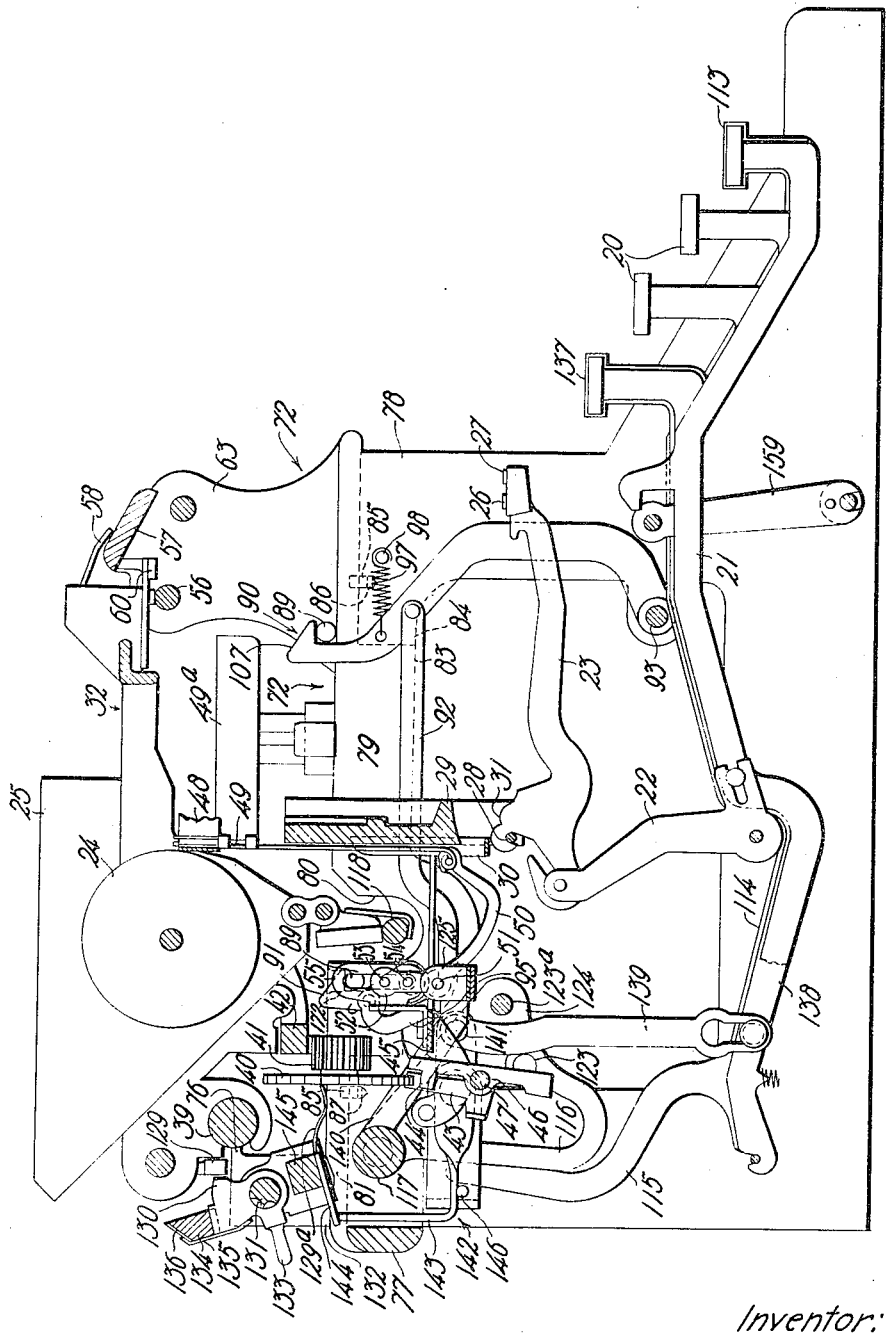

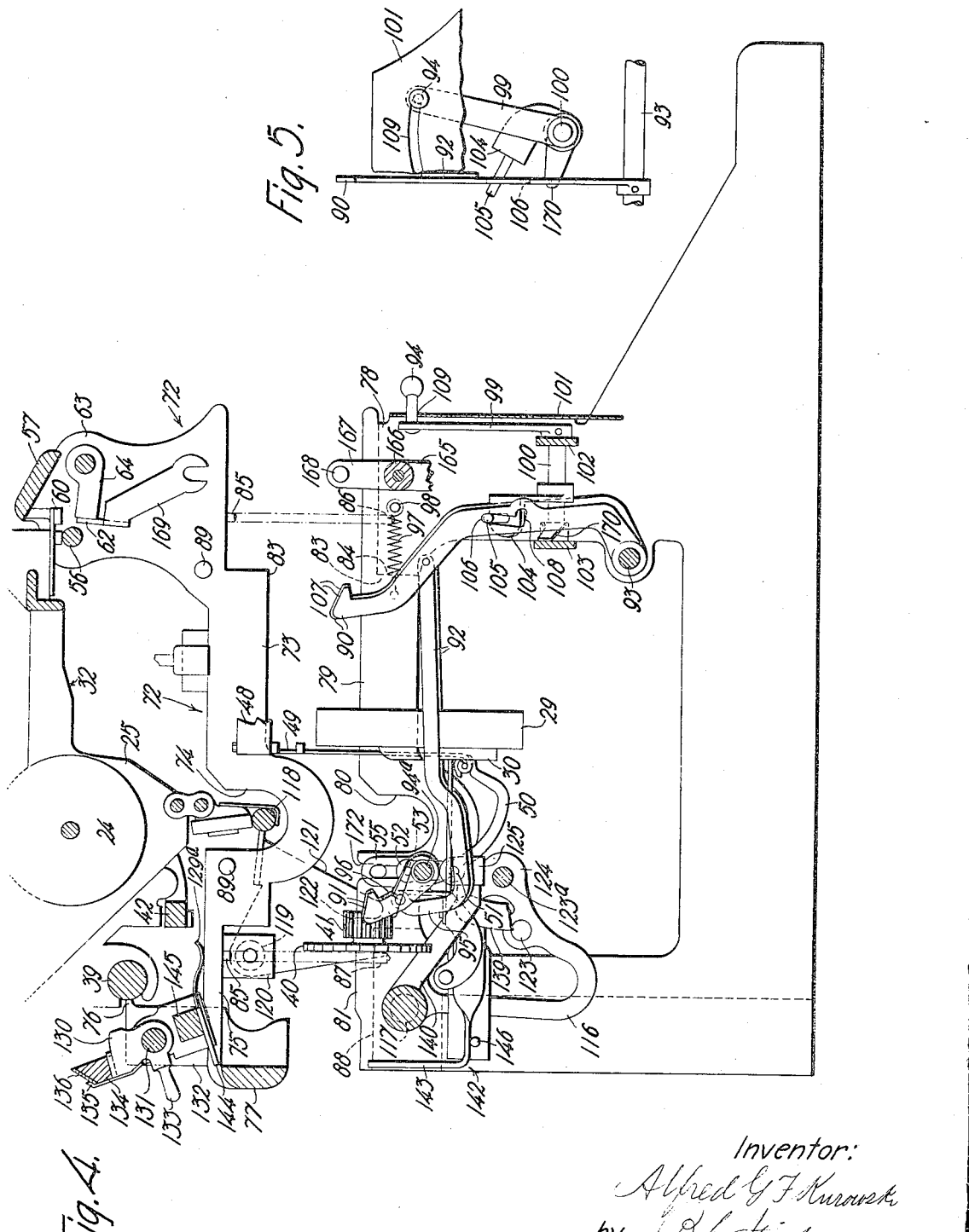

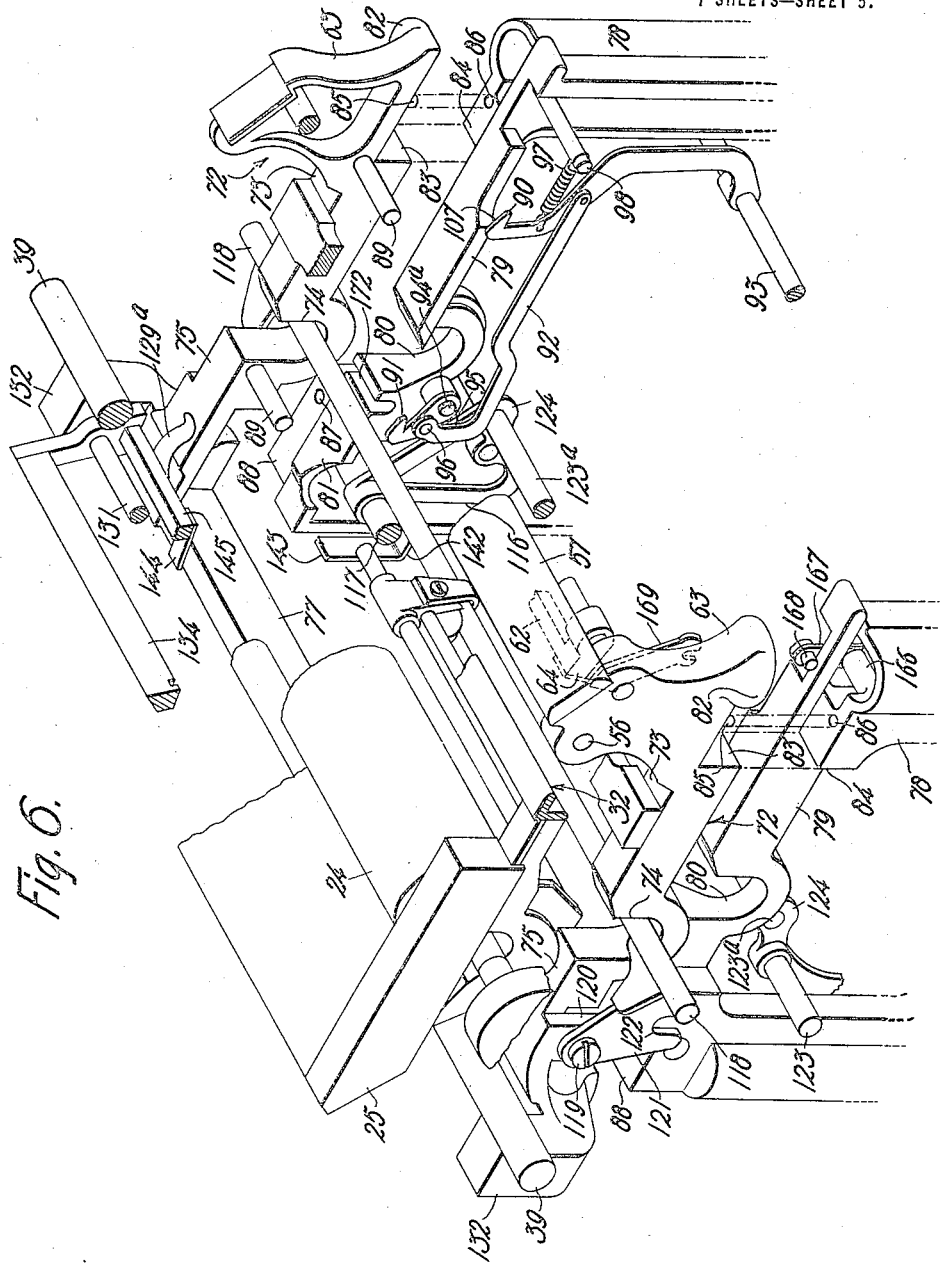

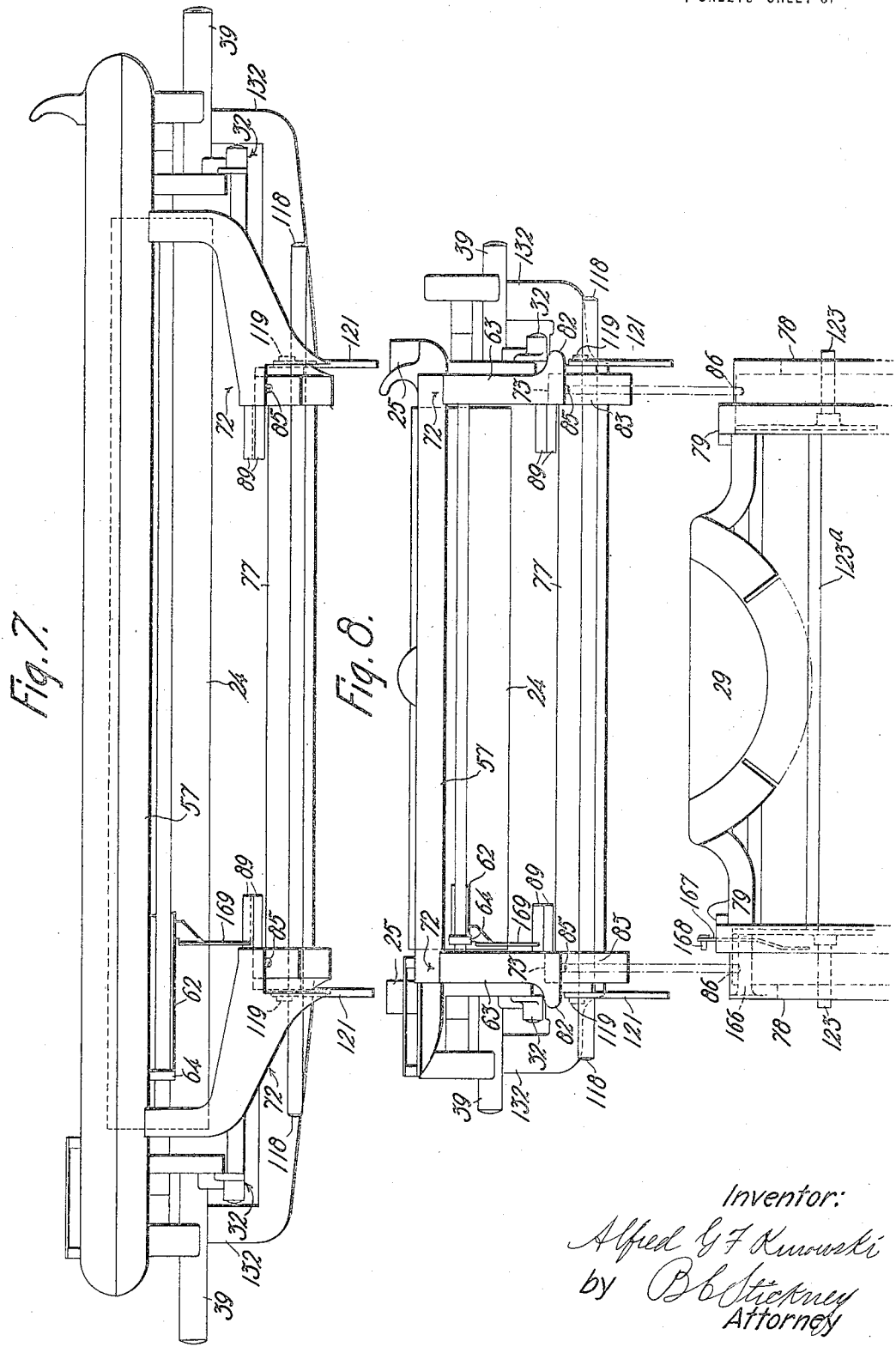

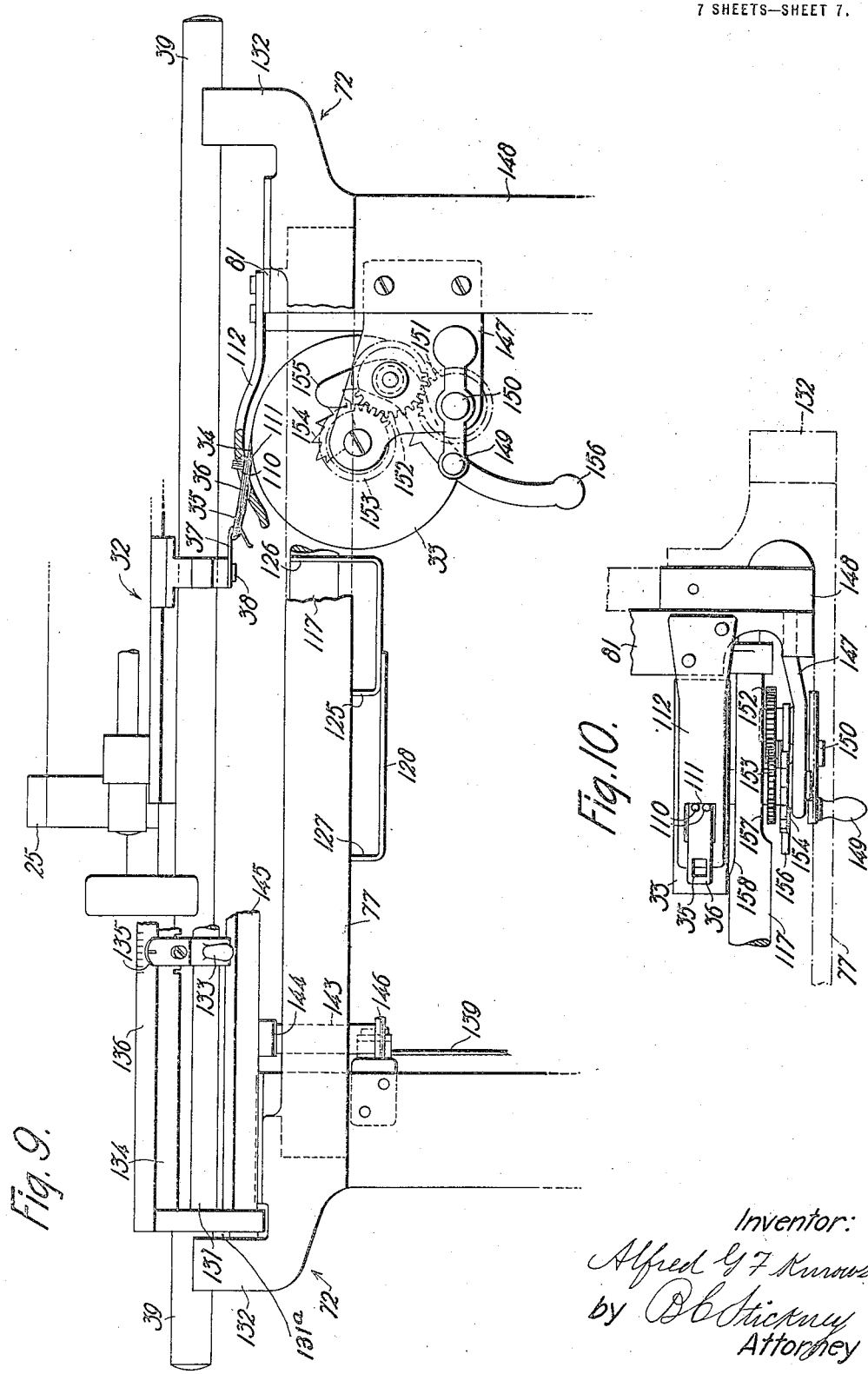

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

1,425,390.      Specification of Letters Patent.     Patented Aug. 8, 1922.

Application filed May 1, 1920. Serial No. 378,205.

*To all whom it may concern:*

Be it known that I, ALFRED G. F. KUROWSKI, a citizen of the United States, residing in Brooklyn Borough, in the county of Kings, city and State of New York, have invented certain new and useful Improvements in Typewriting Machines, of which the following is a specification.

This invention relates to typewriting machines which for the most part have been fitted with carriages of standard lengths, the frames of the typewriting machines being usually specially designed to fit each length of carriage. In order to make good type impressions, and have an otherwise satisfactory machine, the travel of the carriage must be accurately controlled, both endwise and relatively to the vertical plane which runs lengthwise of its travel, and for this reason different lengths of carriage have been provided with different tracks and track-framework. The result has been that typewriting machines kept in stock in stores were usually only of the particular carriage length most in demand, and machines having other lengths of carriage have had to be specially procured. Moreover, in any office, a machine could usually only have one length of carriage, even if it was desirable that the machine should use a carriage of extraordinary length for short times, occasionally. The use of machines having carriages of extraordinary lengths for ordinary work is not satisfactory, since such machines take up an extraordinary amount of room, the carriages are heavy, affecting the touch of the machine, and increasing the noise incident to operating it, and the long carriage machine does not fit in any of the ordinary desks used for typewriting machines.

According to the present invention, the typewriter carriage may be removable and replaceable by a carriage of greater or less length, and preferably the construction is such that not only is the carriage itself removable, but also the rails upon which the carriage travels, thus permitting new rails to be attached to the machine simultaneously with the attaching of a new carriage. In the form herein disclosed, the ordinary Underwood typewriting machine frame is slightly modified, so that the top of the frame, including the carriage rails and the front scale plate, may be removable; and the structure is preferably such that a shift-rail is provided which is removable with this top part of the frame; the ribbon-vibrating mechanism and the type-actions, together with many other parts, remaining upon the main frame when the carriage and the rails are removed.

It has been found possible to so construct a removable section of the frame that it may be located upon the main frame by a few dowel-pins, preferably one at each of the four corners, and be locked down on said pins by hooks which may be operated by a single handle. Very few parts need be especially adjusted in attaching the carriage and detachable part of the frame. Preferably the line-locking mechanism upon the frame automatically hooks into parts on the detachable portion, and the shift-rail mechanism automatically catches over a main shifting mechanism. The tabulating mechanism may be operated by an arm which may be separated by mere lifting. In most forms of the machine, no other special connections are needed aside from the drawband connection to the carriage.

Other features and advantages will hereinafter appear.

In the accompanying drawings,

Figure 1 is a front view, largely diagrammatic, of an Underwood typewriting machine, showing the present invention as applied thereto, many parts being omitted or broken away.

Figure 2 is a side view, partly in section, of the machine shown in Figure 1, with many parts omitted.

Figure 3 is a sectional side view of many of the parts shown in Figure 2.

Figure 4 is a side view, showing many of the parts shown in Figures 2 and 3, and showing the carriage and detachable part of the frame lifted away from the main frame.

Figure 5 is a front view of the finger-piece and some of its connections for fastening the carriage and detachable parts in place.

Figure 6 is a perspective view of the upper portion of the machine seen at Figure 4.

Figure 7 is a front view of the detachable portion of a long frame and its carriage.

Figure 8 is a diagrammatic view, showing how the detachable part of a short frame fits onto the main part of the frame.

Figure 9 is a rear view, showing the device for drawing the carriage along at the letter-feeding operation, and some adjacent parts.

Figure 10 is a plan view of part of Figure 9.

In the Underwood standard typewriting machine, character keys 20 are mounted on the front ends of key-levers 21, which, when the keys are depressed, rock bell-cranks 22 to swing type-bars 23 upwardly and rearwardly against the platen 24, revolubly mounted in a shiftable platen frame 25, so that lower-case types 26 or upper-case types 27 may print on a work-sheet passed around the platen. The type-bars 23 are journaled on a pivot-wire 28 of a segment 29, and, as they approach the platen, are adapted to actuate a segmental universal bar 30 by heels 31 upon the type-bars 23. The carriage 32, in which the shift frame 25 is mounted, is constantly under tension of a spring-barrel 33, which tends to draw it to the left at Figures 1 and 6. For this purpose, the spring-barrel is connected to a belt 34, having an eye 35 in a metal-strip 36 on its end, which is adapted to be hooked onto a hook 37 fast to a lug 38, projecting downwardly from the typewriter carriage behind the rear rail 39 upon which the carriage travels. The carriage is, however, held against the tension of the spring-barrel by an escapement wheel 40, which is connected in the usual manner to a pinion 41, which meshes with a rack 42 pivotally mounted upon the typewriter carriage. The escapement wheel 40 is normally held against movement by a loose dog 43, which lies in engagement with said wheel, and is held at the limit of its throw by a fixed dog 44.

Whenever a type-bar 23 rises and its heel 31 moves the universal bar 30 rearwardly, the rear end 45 of the universal bar strikes a part of the dog-rocker 46 on which the fixed dog 44 is fast, and rocks it rearwardly around its pivot 47 in the frame of the machine, thereby carrying the loose dog 43 out of engagement with the wheel 40 and slipping the fixed dog 44 into engagement with the wheel. This permits a spring, not shown, to draw the loose dog to the left at Figure 1, with the result that, on the rise of the key 20 and the return stroke of the universal bar 30, the loose dog 43, coming into engagement with the escapement wheel 40, allows said escapement wheel to feed the space of one tooth.

To enable the rising types 26 or 27 to print at the key depression, there is provided a ribbon 48, drawn from the usual spools 49ª and threaded through a ribbon-carrier 49 which vibrates upon a type-guide not shown, upon the segment 29. To vibrate the ribbon 48 upwardly at the rise of the type-bar 23, the ribbon-carrier 49 is pivoted at its bottom to a vibrator-lever 50 pivoted at 51 on a part which will hereinafter be described, said lever 50 forming a vibrator having at its other end 52 a pair of pins 53 and 54, which are adapted to selectively engage with a housing 55 mounted upon the universal bar 30 in the usual manner. The connections are such that whenever the universal bar 30 moves rearwardly, the vibrator 50 moves upwardly, lifting the ribbon-carrier to bring the ribbon 48 between the type and the platen. As the typewriter carriage travels along during the typing operation, traveling on its rear rail 39, it also travels upon its front rail 56 beneath the front bar 57 along which the carriage pointer 58 travels.

In order to ring a bell 59 as the typewriter carriage approaches the end of its line, there is provided a tappet 60, fast upon the carriage, which is adapted to operate a cam member 61 splined to a rock-bar 62 journaled in the upwardly-projecting ends 63 in which the rail 56 is mounted. The cam member 61 is rocked by the tappet 60, rocking the rock-bar 62 and causing the rock arm 64, fast on said bar 62, to rock downwardly and forwardly so as to operate a bell-clapper 65 by connections which will hereinafter be described, and most of which are described in some detail in the patent to Barnard, No. 982,701, patented January 24, 1911.

The cam member 61 is connected in any suitable way, as for example, shown in said patent, to a suitable left-hand margin stop 66, which is adapted to be adjusted along the bar 62 in the direction of the travel of the carriage by a finger-piece 67. Usually there is also provided a right-hand margin stop, 68 adjustable to arrest the carriage at the right-hand limit of its travel. When the carriage has traveled along, and a line of typing has been typed, the carriage is usually returned by catching the line-space handle 69, pivoted at 70 upon the carriage, and adapted to drive rearwardly the usual slide, not shown, to turn the line-space wheel 71 by the usual pawl, not shown.

According to the present invention, the usual typewriter frame is cut off at a point below the rails 39 and 56, and these two rails are carried upon a casting 72 forming a secondary or subsidiary frame, which includes the projections 63, and rearwardly-extending horizontal bars 73, each provided with a U opening 74, and continued in a rear horizontal bar 75 to lugs 76 upon which the rail 39 is carried. The casting 72 further includes a tie-bar 77 extending from one end of the frame to the other behind and beneath the lugs 76. The casting 72 is provided with a flat under surface, which is adapted to fit on the flat tops of the side posts 78 of the main frame of the typewriter, with its bar 73, its U 74 and its flat bar 75 lying close to, but just outside of, a flat bar 79, a U 80 and a flat bar 81 of the typewriter frame, which, in many ways, are shaped like those in the ordinary Underwood typewriting machine. The top of each post 78 is set slightly below the top of the adjacent flat bar 79, so that the casting 72 rests on the tops of the posts 78 by an extension 82, the lower side of which is at a higher level than the lower side of the bar 73, with the result that the front end 83 of the bottom of the bar 73 lies against the rear extension 84 of the adjacent post 78.

To keep the casting 72 and the parts thereon firmly fixed against slipping, the casting is herein shown with dowel-pins 85 at four points, adapted to fit in openings 86 in the extensions 84, and in openings 87 on upwardly-projecting lugs 88 of the flat bars 81, thus giving the casting a firm hold substantially at the four corners of the main frame of the typewriter.

In order to hold the subsidiary frame casting 72 down firmly on the main frame there are provided horizontal pins 89 projecting inwardly from the front of the upper extensions 63 and inwardly from the rear flat bars 75, each front pin or lug 89 being adapted to be engaged by a front hook 90, and each rear pin or lug 89 by a rear hook 91, to hold the casting 72 down. The front and rear hooks 90 and 91 are joined together in pairs by links 92, and the two front hooks 90 are fast on a common rock-shaft 93, so that a single finger-piece 94 may be effective to operate all the hooks. The rear hooks 91 are journaled on interior studs 94ª projecting inwardly from the U 80 of the main frame, and these hooks are comparatively short and are connected near their tops to up-turned ends 95 of the links 92 through pivots 96. Each link 92 is pivoted further down on its longer front hook 90 to obtain the requisite proportional throw of the front and rear hooks 90 and 91. Normally, the hooks are drawn forward to their effective position by a spring 97, which is anchored on an inwardly-projecting post 98 on the main frame of the typewriter.

To enable the finger-piece 94 to release all the hooks 90 and 91, the finger-piece is formed as the front projection of a rock-arm 99 fast on a short forwardly-extending rock-shaft 100, which lies behind the front plate 101 of the typewriting machine, and is journaled in suitable lugs 102 and 103 projecting inwardly from the frame. The rock-shaft 100 carries an upstanding bent-over rock-arm 104, having a projecting pin 105 extending into a cam-slot 106 in the left-hand hook 90, with the result that the swinging of the finger-piece 94 to the right lifts the pin 105 in the slot and cams the hooks to the rear, to the Figures 4 and 5 position, thus carrying them clear of the pins or lugs 89. This permits the casting 72 and adjacent parts to be lifted from the typewriting machine frame, so far as the parts heretofore described are concerned.

In order to permit the casting to be inserted or replaced, whether the hooks 90 and 91 are in their effective position or not, the top of each hook is provided with a cam 107 adapted to permt its pin 89, when descending, to cam the hook rearwardly against the tension of the spring 97. To permit this to be done, the cam-slot 106 has a lower extension 108, which permits the hook to swing to the rear, even though the finger-piece 94 is in its left-hand or "locked" position, as seen in Figure 1. To enable the typist to know immediately whether the carriage and casting 72 are locked down, there is provided a legend "carriage locked, unlocked" adjacent the finger-piece 94 just above the slot 109, through which it projects from the front plate 101.

When the finger-piece 94 is in its right-hand position, and the casting 72 is lifted off, the rack 42 simply lifts out of the pinion 41 and allows the spring-barrel 33 to wind up its draw-belt 34 until a pair of pins 110 on the strip 36 engages with an arresting edge of a slot 111 of a guide piece 112, which is fast upon the right-hand flat bar 81, as viewed from the rear in Figure 9, with the result that the belt is prevented from unwinding any further. Usually it will be found advisable to unhook the belt 34 from the hook 37 before lifting the casting 72 and the carriage.

To effect case-shifting, the typewriter frame is provided with a shift key 113, which may be of the usual kind and be mounted at the front end of a key-lever 114, having an upstanding arm 115, which lies behind the rear side of the lower arm 116 of a bell-crank forming part of a shift frame, journaled by its shaft 117 in the ends of the main frame. The shift-rail 118, according to the present invention, forms part of a separate shift frame, which is journaled at its ends by screws 119 threaded into outside lugs 120 which project downwardly from the flat bars 75. The separate or secondary shift frame, which includes the rail 118, also includes end plates or bars 121, which are provided with bottom forks 122 adapted to engage over studs 123 on the bell-cranks 116. The bell-cranks may be connected by a cross-rod 123ª connecting the front ends 124 of the bell-cranks 116. Thus, the shift-rail 118 is lifted with its bars 121 with the casting 72 when the latter is lifted, the forks 122 rising clear of the studs 123.

To avoid the complexities which would arise if the pivot 51 of the ribbon vibrator were fast to the shift-rail 118, the pivot 51 is riveted or threaded into a plate or arm 125, which is fast to the shaft 117 and forms part of a frame fast thereon, said frame also including end members 126, 127 and a connecting member 128. Thus, the ribbon-carrier 49 rises with the platen at the case-shift operation, as in the usual Underwood typewriting machine, although the shift-rail 118 is not its pivot support.

The tabulating device for the carriage 32 in many respects may be identical with the usual Underwood typewriting machine tabulating device, and may include a lug or stop 129 upon the typewriter carriage, which is adapted to be intercepted by any one of a series of settable lugs 130 forming counterstops, which are journaled on a rod 131, forming part of a stop-support which is journaled at 131ª (Figure 9) in upstanding lugs 132 at the ends of the tie-bar 77. The stops 130 are provided with handles 133 by which they may be swung around the rod 131 into and out of engagement with the usual comb or rack-bar 134, and be adjusted by their pointers 135 along the scale 136.

Whenever the tabulating key 137 is depressed to carry down its key-lever 138, it draws down a link 139 which may be of the usual kind; said link being pivotally connected at 141 to an arm 140 journaled upon the shaft 117. Also pivotally connected to the arm 140, at the pivot 141, is an elbow-arm 142 having an upstanding rear end 143, which underlies a rearwardly-projecting arm or lug 144 on a bar 145 forming part of the stop-support, in line with the pivots 131ª thereof (Figure 9). When the tabulating key 137 is drawn down, the elbow-arm 142 has its rear end 143 drawn upwardly by the moving down of the pivot 141, because the elbow-arm rests upon a fixed pin 146 in the typewriter frame. The rising of the rear end 143 swings the stop-frame, including the stops 130, against the tension of its usual spring 129ª, to bring the stops 130 into the path of the lug 129, and thereby arrests the carriage by the stop next to the left of the lug 129; the carriage having in the meantime been released by the lifting of the rack bar 42, through the usual connections, not shown.

It will be noted that the connection between the rear end 143 and the arm or lug 144 consists merely in the resting of the lug or arm 144 upon the end 143; thus, when the carriage-supporting subsidiary frame 72 is lifted, the lug 144 will be lifted away from the arm end 143, and the tabulating device will be automatically connected when a new carriage and subsidiary frame are placed upon the main frame of the typewriting machine.

The spring-drum or barrel 33 occupies, according to the present invention, a somewhat different position from what it does in the usual Underwood standard typewriting machine, and for this purpose is journaled upon a bracket 147, projecting from a rear upright 148 of the frame of the typewriting machine. The spring-barrel 33 may be tensioned by turning a handle 149, fast on a stub shaft 150, journaled in the bracket 147 and fast to a pinion 151, which meshes with a pinion 152, meshing in turn with a pinion 153 fast to the shaft of the spring-barrel 33. In order to hold the spring-barrel tensioned when it is wound up by turning the handle 149, there is fast to the pinion 153 a ratchet wheel 154, which is engaged by a spring pawl 155 of much the usual kind, and adapted to be released by a handle 156 in the usual manner. By reason of this construction, it will be seen that the winding handle 149 will clear the tie-bar 77 of the subsidiary frame 72.

For compactness, the shaft 117 may be cut away at 157 and 158 (Figure 10) to allow the spring-barrel 33 and the pinion 153 to be brought closer together. The line-locking and bell-ringing mechanism, as heretofore stated, may in many respects resemble that of said Barnard patent, and includes not only the bell-ringing lever 65 but also the key-locking bail 159, which are, respectively, adapted to be operated by the swinging tappet 160 and its lever 161.

According to the present invention, the lever 161 is a comparatively short lever, pivoted on a stud 162 on the frame of the machine and having a short upper extension 163, connected by a pin-and-slot connection 164 to the lower end of a secondary lever 165, pivoted on a stud 166 also fast on the frame of the machine. The arm 64, described above, may operate the lever 165 by a short upper extension 167 thereof, carrying a pin or stud 168 over which a fork 169, projecting downwardly from the arm 64, is adapted to fit. When the subsidiary frame 72 is lifted, the fork of the extension arm 169 will rise clear of the stud 168, and when a new subsidiary frame is placed on the main frame of the typewriter, the line-locking mechanism automatically connects itself at the stud 168 and fork 169.

In order to make sure that the handle 94 shall not let its hooks work loose, its shaft may be provided with a detent arm 170, adapted to seat itself in either of two detent openings 171 in the supporting lug 103, according to the position of the arm. To assist in steadying the subsidiary frame upon the main frame, the rear pins 89 may seat themselves in hollows 172 (Figures 2, 4 and 6) in the flat bars 81, so that the adjacent hook 91 draws its pin down into a hollow.

In Figure 8, at the bottom, is shown the main frame of an Underwood typewriting machine constructed according to the present invention, and the upper half of the figure shows how a short carriage and short subsidiary frame will fit thereon, the path of the dowel-pins 85 being indicated by dotted lines.

Figure 7, standing immediately above Figure 8, shows a longer carriage, and a longer sudsidiary frame which is adapted to fit on the main frame shown at the bottom of Figure 8. These figures indicate the parts on the main frame and the subsidiary frame which interlock or fit into each other, and also indicate the long carriage rail for the long carriage, showing how this extends out beyond the short rail for the shorter carriage when the two subsidiary frames are placed in the same relative position.

Variations may be resorted to within the scope of the invention, and portions of the improvements may be used without others.

Having thus described my invention, I claim:

1. In a typewriting machine, the combination with a main frame and type-actions therein, of a carriage, rails for said carriage, a subsidiary frame including said rails detachably mounted on said main frame to enable another subsidiary frame to be mounted thereon, a plurality of releasable devices for detachably holding the subsidiary frame on the main frame, and connections between said devices for operating all of said devices concomitantly to render them effective or ineffective.

2. In a typewriting machine, the combination with a main frame and type-actions therein, of a carriage, rails for said carriage, a detachable subsidiary frame including said rails, dowel pins on the subsidiary frame adapted to enter openings in the main frame, a hook adjacent each corner of the machine for holding the subsidiary frame down upon the main frame, and connections between the hooks for operating all the hooks concomitantly to render them effective or ineffective.

3. In a typewriting machine, the combination with a main frame and type-actions therein, of a carriage, rails for said carriage, a detachable subsidiary frame including said rails, a case-shift mechanism including parts upon the main frame, a case-shift rail having case-shift movement on the subsidiary frame, also included in said mechanism, said case-shift rail being operable by the parts of said case-shift mechanism on the main frame and disconnectible therefrom by the detaching of the subsidiary frame, and means for detachably holding the subsidiary frame upon the main frame.

4. In a typewriting machine, the combination with a main frame and type-actions therein, of a carriage, rails for said carriage, a detachable subsidiary frame including said rails, carriage-feeding devices including an escapement wheel upon the main frame, a rack upon the carriage adapted to be separated from the feeding devices by lifting the subsidiary frame, a plurality of releasable devices for holding the subsidiary frame upon the main frame, and connections between said releasable devices for operating all said releasable devices concomitantly to render them effective or ineffective.

5. In a typewriting machine, the combination with a main frame and type-actions therein, of a carriage, rails for said carriage, a detachable subsidiary frame including said rails, a case-shift device on the main frame, a case-shift rail mounted for case-shift movement on the subsidiary frame to be operated by said case-shift device and disconnectible from the case-shift device by the detaching of the subsidiary frame, a ribbon holding and vibrating device mounted on the main frame and connected to the case-shift device to partake of the case-shift movement, a universal bar also mounted on the main frame and connected to the ribbon-vibrating device to vibrate the ribbon, and means for detachably holding the subsidiary frame upon the main frame.

6. In a typewriting machine, the combination with a main frame and type-actions therein, of a carriage, rails for said carriage, a detachable subsidiary frame including said rails, a tabulating key upon the main frame, a tabulating stop and a counter-stop upon the subsidiary frame, a device on the subsidiary frame adapted to be moved to make the tabulating stop and counter-stop effective to arrest the carriage, and an arm movable upon the main frame and operated by the tabulating key to make the device effective, said device being disconnectible and movable away from said arm by the detaching of the subsidiary frame.

7. In a typewriting machine, the combination with a main frame and type-actions therein, of a carriage, rails for said carriage, a subsidiary frame including said rails, dowel pins on the subsidiary frame adapted to enter openings in the main frame, a plurality of hooks adapted to catch on the subsidiary frame to hold it upon the main frame, and a single finger-piece for simultaneously actuating all the hooks.

8. In a typewriting machine, the combination with a main frame and type-actions therein, of a carriage, rails for said carriage, an escapement device including a rack, a tabulating device including an arm, a line-locking device including a lever, and a detachable subsidiary frame including the rails for said carriage, and also including said rack, said arm and said lever, the other parts of said devices being located upon the main frame, said rack and arm and lever being disconnectible and liftable away from said other parts of the respective devices by lifting the subsidiary frame away from the main frame.

9. In a typewriting machine, the combination with a main frame and type-actions therein, of a carriage, rails for said carriage, a detachable subsidiary frame including said rails, a case-shift mechanism including parts upon the main frame, a case-shift rail having case-shift movement on the subsidiary frame also included in said mechanism, said case-shift rail being operable by the parts of said case-shift mechanism on the main frame and disconnectible therefrom by the detaching of the subsidiary frame, means for detachably holding the subsidiary frame upon the main frame, and a ribbon-vibrating mechanism on the main frame and connected to the case-shift mechanism parts thereon to shift with said parts at the case-shift operation.

10. In a typewriting machine, the combination with a main frame and type-actions therein, of a carriage, rails for said carriage, a case-shift rail for said carriage, a subsidiary frame in which all said rails are mounted, a case-shift device in the main frame for shifting the case-shift rail, and a ribbon-vibrating mechanism comprising a pivot connected to said device.

11. In a typewriting machine, the combination with a main frame and type-actions therein, of a carriage, rails for said carriage, a U-shaped side-bar for each side of the main frame, extensions of said main frame outside said side-bars, a subsidiary frame having U-shaped side-bars adapted to fit along the main frame side-bars and carrying said rails and adapted to fit on said extensions, and a shift-rail in said subsidiary frame guiding the carriage through said U's.

12. In a typewriting machine, the combination with a main frame and type-actions therein, of a carriage, rails for said carriage, a U-shaped side-bar for each side of the main frame, extensions of said main frame outside said side-bars, a subsidiary frame having U-shaped side-bars adapted to fit along the main frame side-bars and carrying said rails and adapted to fit on said extensions, a shift-rail in said subsidiary frame guiding the carriage through said U's, a lug adjacent each corner of the subsidiary frame, and a hook for each lug adapted to hold the frames together.

13. In a typewriting machine, the combination with a main frame and type-actions therein, of a carriage, rails for said carriage, a U-shaped side-bar for each side of the main frame, extensions of said main frame outside said side-bars, a subsidiary frame having U-shaped side-bars adapted to fit along the main frame side-bars and carrying said rails and adapted to fit on said extensions, a shift-rail in said subsidiary frame guiding the carriage through said U's, a case-shift device in the main frame comprising a bell-crank device at each end, a stud on each bell-crank device, a fork for engaging each stud, and means for supporting the shift-rail by the studs.

14. In a typewriting machine, the combination with a main frame and type-actions therein, of a carriage, rails for said carriage, a subsidiary frame carrying said rails and adapted to fit on the main frame, studs on the subsidiary frame, hooks on the main frame adapted to be cammed to one side by said studs and to catch over them to hold the frames together, and manually-operable means for concomitantly releasing all the hooks to enable the removal of the subsidiary frame together with the parts carried thereby.

15. In a typewriting machine, the combination with a main frame and type-actions therein, of a carriage, rails for said carriage, a subsidiary frame including said rails adapted to rest on the main frame, a hook on the main frame near each corner adapted to catch the subsidiary frame, a link connecting each front hook to the adjacent back hook, and a rock-shaft to which the front hooks are fast.

16. In a typewriting machine, the combination with a main frame and type-actions therein, of a carriage, rails for said carriage, a subsidiary frame including said rails adapted to rest on the main frame, a hook on the main frame near each corner adapted to catch the subsidiary frame, a link connecting each front hook to the adjacent back hook, a rock-shaft to which the front hooks are fast, and a finger-piece adapted to make the hooks ineffective at will.

17. In a typewriting machine, the combination with a main frame and type-actions therein, of a carriage, rails for said carriage, a subsidiary frame carrying said rails and adapted to fit on the main frame, studs on the subsidiary frame, hooks on the main frame adapted to be cammed to one side by said studs and to catch over them to hold the frames together, a tabulating device including an arm, an escapement device including a rack, and a line-locking device including a lever, said arm and rack and lever on said subsidiary frame and adapted to be connected to the rest of their devices by positioning the subsidiary frame on the main frame.

18. In a typewriting machine, the combination with a main frame, of key-actions on said frame, ribbon-supporting and vibrating devices on said frame, escapement devices including a pinion and its connections to the keys on said frame, bell-ringing devices including a lever extending toward the position of a stop mechanism and also mounted on the frame, a subsidiary frame, a carriage on the subsidiary frame, an escapement rack on the subsidiary frame, rails and stop mechanism for the carriage also on the subsidiary frame, and devices for releasably holding the frames together.

19. In a typewriting machine, the combination with a main frame, of key-actions on said frame, ribbon-supporting and vibrating devices on said frame, escapement devices including a pinion and its connections to the keys on said frame, bell-ringing devices including a lever extending toward the position of a stop mechanism and also mounted on the frame, a case-shift device on the frame, a subsidiary frame including a carriage, an escapement rack for the pinion on the carriage, rails including a case-shift rail on the subsidiary frame, and a margin stop on the subsidiary frame, the connections being such that the superpositioning of the subsidiary frame connects the pinion to the rack, the case-shift rail to its device, and the mechanism to its margin stop.

20. In a typewriting machine, the combination with a main frame, of key-actions on said frame, ribbon-supporting and vibrating devices on said frame, escapement devices including a pinion and its connections to the keys on said frame, bell-ringing devices including a lever extending toward the position of a stop mechanism and also mounted on the frame, a tabulating key upon the frame, an operating arm actuated by said key, a subsidiary frame including a carriage, an escapement rack for the pinion on the carriage, a margin stop on the subsidiary frame, and a tabulating stop on the subsidiary frame, the connections being such that the superpositioning of the subsidiary frame connects the pinion to the rack, the arm to the tabulating stop, and the mechanism to the margin stop.

21. In a typewriting machine, the combination with a main frame, of key-actions on said frame, ribbon-supporting and vibrating devices on said frame, escapement devices including a pinion and its connections to the keys on said frame, bell-ringing devices including a lever extending toward the position of a stop mechanism and also mounted on the frame, a subsidiary frame adapted to rest on extensions of the first frame, a carriage on the subsidiary frame, an escapement rack on the subsidiary frame, rails and stop mechanism for the carriage also on the subsidiary frame, devices for releasably holding the frames together, and means for releasably locking the frames together.

22. In a typewriting machine, the combination with a main frame and type-actions therein, of a carriage, rails for the carriage, a detachable subsidiary frame including said rails, means to prevent lateral slipping of the subsidiary frame on the main frame, a plurality of devices for firmly locking the subsidiary frame upon the main frame, and manually-operable means for concomitantly operating all said devices.

23. In a typewriting machine, the combination with a main frame and type-actions therein, of a carriage, rails for said carriage, a shiftable case-shift rail for said carriage, a detachable subsidiary frame in which all said rails are mounted, a case-shift device in the main frame for shifting the case-shift rail, and a ribbon-vibrating mechanism in the main frame connected to said device to partake of the case-shift movement thereof.

24. In a typewriting machine, the combination with a main frame and type-actions therein, of a carriage, rails for said carriage, a U-shaped side-bar for each side of the main frame, extensions of said main frame outside said side-bars, a subsidiary frame having U-shaped side-bars adapted to fit along the main frame side-bars and carrying said rails and adapted to fit on said extensions, a shift-rail in said subsidiary frame guiding the carriage through said U's, a case-shift device in the main frame comprising a bell-crank device at each end, a stud on each bell-crank device, and a fork for disengageably engaging each stud to shift the shift-rail by the studs, said fork carrying the shift-rail and being journaled on the subsidiary frame.

25. In a front-strike typewriting machine, in combination, a main frame, type-actions therein, a subsidiary top frame adapted to be detachably secured upon the main frame, a case-shift mechanism having parts mounted upon the main frame and having other parts mounted for case-shift movement upon the subsidiary frame, said parts on the subsidiary frame being co-operative with said parts on the main frame and disconnectible therefrom by the detaching of the subsidiary frame, carriage-rails forming parts of the subsidiary frame, a carriage mounted to travel upon the carriage-rails, and a revoluble platen mounted on the carriage to have case-shift movement imparted thereto by the parts of said case-shift mechanism on the subsidiary frame.

26. In a front-strike typewriting machine, in combination, a main frame, type-actions therein, a case-shift device therein, a subsidiary top frame adapted to be detachably secured upon the main frame, carriage-rails forming parts of the subsidiary frame, a case-shift rail mounted for case-shift movement upon the subsidiary frame, a carriage mounted to travel upon the carriage-rails, and a revoluble platen mounted on the carriage to have case-shift movement imparted thereto by said case-shift rail, said case-shift rail being co-operative with said case-shift device and disconnectible therefrom by the detaching of the subsidiary frame.

27. In a front-strike typewriting machine, in combination, a main frame, type-actions therein, a subsidiary top frame adapted to be detachably secured upon the main frame, a case-shift mechanism having parts mounted upon the main frame and having other parts mounted for case-shift movement upon the subsidiary frame, said parts on the subsidiary frame being co-operative with said parts on the main frame and disconnectible therefrom by the detaching of the subsidiary frame, carriage-rails forming parts of the subsidiary frame, a carriage mounted to travel upon the carriage-rails, a revoluble platen mounted on the carriage to have case-shift movement imparted thereto by the parts of said case-shift mechanism on the subsidiary frame, and a ribbon-vibrating mechanism mounted upon the main frame and connected to a part of the case-shift mechanism on the main frame to partake of the case-shift movement.

28. In a front-strike typewriting machine, in combination, a main frame, type-actions therein, a case-shift device therein, a subsidiary top frame adapted to be detachably secured upon the main frame, carriage-rails forming parts of the subsidiary frame, a case-shift rail mounted for case-shift movement upon the subsidiary frame, a carriage mounted to travel upon the carriage-rails, a revoluble platen mounted on the carriage to have case-shift movement imparted thereto by said case-shift rail, said case-shift rail being co-operative with said case-shift device and disconnectible therefrom by the detaching of the subsidiary frame, a ribbon-vibrating mechanism mounted on the main frame and connected to the case-shift device to partake of the case-shift movement, and a universal bar on the main frame connected to the ribbon-vibrating mechanism to vibrate the ribbon.

29. In a front-strike typewriting machine, in combination, a main frame, type-actions therein, a subsidiary top frame adapted to be detachably secured upon the main frame, a tabulating device having parts movably mounted upon the main frame and having other parts mounted for tabulating movement upon the subsidiary frame, the parts of said device on the subsidiary frame being co-operative with and operable by the parts of said device on the main frame and disconnectible therefrom by the detaching of the subsidiary frame, carriage-rails forming parts of the subsidiary frame, and a platen-carrying carriage mounted to travel upon the carriage-rails.

30. In a front-strike typewriting machine, in combination, a main frame, type-actions therein, a subsidiary top frame adapted to be detachably secured upon the main frame, carriage-rails forming parts of the subsidiary frame, a platen-carrying carriage mounted to travel on the carriage-rails, a warning bell mounted on the main frame, bell-ringing mechanism having parts mounted upon the main frame and having other parts mounted upon the subsidiary frame, said parts on the subsidiary frame being co-operative with said parts on the main frame to actuate the latter and being disconnectible therefrom by the detaching of the subsidiary frame, and a tappet on the carriage for actuating the parts of said mechanism on the subsidiary frame to ring the bell.

31. In a front-strike typewriting machine, in combination, a main frame, type-actions therein, a subsidiary top frame adapted to be detachably secured upon the main frame, carriage-rails forming parts of the subsidiary frame, a platen-carrying carriage mounted to travel on the carriage-rails, a line-locking mechanism having parts mounted upon the main frame and having other parts mounted upon the subsidiary frame, said parts on the subsidiary frame being cooperative with said parts on the main frame to actuate the latter and being disconnectible therefrom by the detaching of the subsidiary frame, and a tappet on the carriage for actuating the parts of said mechanism on the subsidiary frame to lock the type-actions at the end of a line.

32. In a front-strike typewriting machine, in combination, a main frame, type-actions therein, a subsidiary top frame adapted to be detachably secured upon the main frame, carriage-rails forming parts of the subsidiary frame, a platen-carrying carriage mounted to travel on the carriage-rails, a bell-ringing device mounted on the main frame, a line-locking device for locking the type-actions also mounted on the main frame, operating mechanism for both said devices having parts mounted upon the main frame and having other parts mounted upon the subsidiary frame, said parts on the subsidiary frame being co-operative with said parts on the main frame to operate the latter and being disconnectible therefrom by the detaching of the subsidiary frame, and a tappet on the carriage to operate the parts of said mechanism on the subsidiary frame for ringing the bell as the end of a line is approached and for locking the type-actions at the end of the line.

33. In a front-strike typewriting machine, in combination, a main frame, type-actions therein, a subsidiary top frame adapted to be detachably secured upon the main frame, carriage-rails forming parts of the subsidiary frame, a platen-carrying carriage mounted to travel upon the carriage-rails, said subsidiary frame including a rear tie-bar at the rear of the upper part of the main frame, a spring-barrel for returning the carriage mounted on the main frame at the rear thereof adjacent to and in front of said tie-bar, a carriage-return spring within the spring-barrel, a winding shaft for the spring, a winding handle rotatively mounted on the main frame below said tie-bar so as to clear the latter, and a train of gears connecting the winding handle to the winding shaft for winding the spring without interference of the winding handle with said tie-bar.

34. In a front-strike typewriting machine, in combination, a main frame, type-actions therein, a subsidiary top frame adapted to be detachably secured upon the main frame, case-shift mechanism having parts mounted upon the main frame and having other parts mounted for case-shift movement upon the subsidiary frame, said parts on the subsidiary frame being cooperative with said parts on the main frame to be operated thereby and being disconnectible therefrom by the detaching of the subsidiary frame, carriage-rails forming parts of the subsidiary frame, a carriage mounted to travel upon the carriage-rails, and a platen-frame shiftably mounted on the carriage to have substantially vertical case-shift movement imparted thereto by the parts of the case-shift mechanism on the subsidiary frame.

35. In a front-strike typewriting machine, in combination, a main frame, type-actions therein, a case-shift device therein, a subsidiary top frame adapted to be detachably secured upon the main frame, carriage-rails forming parts of the subsidiary frame, a case-shift rail mounted for case-shift movement upon the subsidiary frame to be operated by said case-shift device and being disconnectible therefrom by the detaching of the subsidiary frame, a carriage mounted to travel upon the carriage-rails, and a platen-frame shiftably mounted on the carriage to have substantially vertical case-shift movement imparted thereto by said case-shift rail.

36. In a front-strike typewriting machine, in combination, a main frame, type-actions therein, a subsidiary top frame adapted to be detachably secured upon the main frame, case-shift mechanism having parts mounted upon the main frame and having other parts mounted for case-shift movement upon the subsidiary frame, said parts on the subsidiary frame being co-operative with said parts on the main frame and disconnectible therefrom by the detaching of the subsidiary frame, carriage-rails forming parts of the subsidiary frame, a carriage mounted to travel upon the carriage-rails, a platen-frame shiftably mounted on the carriage to have substantially vertical case-shift movement imparted thereto by the parts of the case-shift mechanism on the subsidiary frame, and ribbon-vibrating mechanism mounted upon the main frame and connected to a part of the case-shift mechanism on the main frame to partake of the case-shift movement.

37. In a front-strike typewriting machine, in combination, a main frame, type-actions therein, a case-shift device therein, a subsidiary top frame adapted to be detachably secured upon the main frame, carriage-rails forming parts of the subsidiary frame, a case-shift rail mounted for case-shift movement upon the subsidiary frame to be operated by said case-shift device and being disconnectible therefrom by the detaching of the subsidiary frame, a carriage mounted to travel upon the carriage-rails, a platen-frame shiftably mounted on the carriage to have substantially vertical case-shift movement imparted thereto by said case-shift rail, ribbon-vibrating mechanism mounted on the main frame and connected to the case-shift device to partake of the case-shift movement, and a universal bar on the main frame connected to the ribbon-vibrating mechanism to vibrate the ribbon.

38. In a front-strike typewriting machine, in combination, a main frame, type-actions therein, a case-shift device therein, a detachable subsidiary top frame, means to prevent lateral slipping of the subsidiary frame on the main frame, a plurality of releasable devices for firmly locking the subsidiary frame upon the main frame, manually-operable means for concomitantly operating all of said devices to render them effective or ineffective, carriage-rails forming parts of the subsidiary frame, a case-shift rail mounted for case-shift movement upon the subsidiary frame to be operated by said case-shift device and being disconnectible therefrom by the detaching of the subsidiary frame, a carriage mounted to travel upon the carriage-rails, a platen-frame shiftably mounted upon the carriage to have substantially vertical case-shift movement imparted thereto by said case-shift rail, ribbon-vibrating mechanism mounted on the main frame and connected to the case-shift device to partake of the case-shift movement, a universal bar on the main frame connected to the ribbon-vibrating mechanism to vibrate the ribbon, a tabulating device having parts movably mounted upon the main frame and having other parts mounted for tabulating movement upon the subsidiary frame, the parts of said tabulating device on the subsidiary frame being operable by the parts of said tabulating device on the main frame and disconnectible therefrom by the detaching of the subsidiary frame, a bell-ringing device mounted on the main frame, a line-locking device for locking the type-actions also mounted on the main frame, operating mechanism for said bell-ringing device and for said line-locking device having parts mounted upon the main frame and having other parts mounted upon the subsidiary frame, the parts of said operating mechanism on the subsidiary frame being co-operative with the parts of said operating mechanism on the main frame to operate the latter and being disconnectible therefrom by the detaching of the subsidiary frame, tappet on the carriage to operate the parts of said operating mechanism on the subsidiary frame for ringing the bell as the end of a line is approached and for locking the type-actions at the end of the line, and letter-spacing mechanism for the carriage controlled by the type-actions and including a pinion on the main frame and a rack on the carriage engageable with the pinion and liftable away therefrom by the detaching of the subsidiary frame.

39. In a front-strike typewriting machine, in combination, a main frame, type-actions therein, a case-shift device therein, a detachable subsidiary top frame, means to prevent lateral slipping of the subsidiary frame on the main frame, a plurality of releasable devices for firmly locking the subsidiary frame upon the main frame, manually-operable means for concomitantly operating all of said devices to render them effective or ineffective, carriage-rails forming parts of the subsidiary frame, a case-shift rail mounted for case-shift movement upon the subsidiary frame to be operated by said case-shift device and being disconnectible therefrom by the detaching of the subsidiary frame, a carriage mounted to travel upon the carriage-rails, a platen-frame shiftably mounted upon the carriage to have substantially vertical case-shift movement imparted thereto by said case-shift rail, ribbon-vibrating mechanism mounted on the main frame and connected to the case-shift device to partake of the case-shift movement, a universal bar on the main frame connected to the ribbon-vibrating mechanism to vibrate the ribbon, a tabulating device having parts movably mounted upon the main frame and having other parts mounted for tabulating movement upon the subsidiary frame, the parts of said tabulating device on the subsidiary frame being operable by the parts of said tabulating device on the main frame and disconnectible therefrom by the detaching of the subsidiary frame, a bell-ringing device mounted on the main frame, a line-locking device for locking the type-actions also mounted on the main frame, operating mechanism for said bell-ringing device and for said line-locking device having parts mounted upon the main frame and having other parts mounted upon the subsidiary frame, the parts of said operating mechanism on the subsidiary frame being co-operative with the parts of said operating mechanism on the main frame to operate the latter and being disconnectible therefrom by the detaching of the subsidiary frame, and a tappet on the carriage to operate the parts of said operating mechanism on the subsidiary frame for ringing the bell as the end of a line is approached and for locking the type-actions at the end of the line.

40. In a front-strike typewriting machine, in combination, a main frame, type-actions therein, a case-shift device therein, a detachable subsidiary top frame, means to prevent lateral slipping of the subsidiary frame on the main frame, a plurality of releasable devices for firmly locking the subsidiary frame upon the main frame, manually-operable means for concomitantly operating all of said devices to render them effective or ineffective, carriage-rails forming parts of the subsidiary frame, a case-shift rail mounted for case-shift movement upon the subsidiary frame to be operated by said case-shift device and being disconnectible therefrom by the detaching of the subsidiary frame, a carriage mounted to travel upon the carriage-rails, a platen-frame shiftably mounted upon the carriage to have substantially vertical case-shift movement imparted thereto by said case-shift rail, ribbon-vibrating mechanism mounted on the main frame and connected to the case-shift device to partake of the case-shift movement, and a universal bar on the main frame connected to the ribbon-vibrating mechanism to vibrate the ribbon.

41. In a front-strike typewriting machine, in combination, a main frame, type-actions therein, a case-shift device therein, a detachable subsidiary top frame, means to prevent lateral slipping of the subsidiary frame on the main frame, a plurality of releasable devices for firmly locking the subsidiary frame upon the main frame, manually-operable means for concomitantly operating all of said devices to render them effective or ineffective, carriage-rails forming parts of the subsidiary frame, a platen-carrying carriage mounted to travel upon the carriage-rails, and a tabulating device having parts movably mounted upon the main frame and having other parts mounted for tabulating movement upon the subsidiary frame, the parts of said tabulating device on the subsidiary frame being operable by the parts of said tabulating device on the main frame and disconnectible therefrom by the detaching of the subsidiary frame.

42. In a front-strike typewriting machine, in combination, a main frame, type-actions therein, a case-shift device therein, a detachable subsidiary top frame, means to prevent lateral slipping of the subsidiary frame on the main frame, a plurality of releasable devices for firmly locking the subsidiary frame upon the main frame, manually-operable means for concomitantly operating all of said devices to render them effective or ineffective, carriage-rails forming parts of the subsidiary frame, a platen-carrying carriage mounted to travel upon the carriage-rails, a bell-ringing device mounted on the main frame, a line-locking device for locking the type-actions also mounted on the main frame, operating mechanism for said bell-ringing device and for said line-locking device having parts mounted upon the main frame and having other parts mounted upon the subsidiary frame, the parts of said operating mechanism on the subsidiary frame being co-operative with the parts of said operating mechanism on the main frame to operate the latter and being disconnectible therefrom by the detaching of the subsidiary frame, and a tappet on the carriage to operate the parts of said operating mechanism on the subsidiary frame for ringing the bell as the end of a line is approached and for locking the type-actions at the end of the line.

43. In a front-strike typewriting machine, in combination, a main frame, type-actions therein, a case-shift device therein, a subsidiary top frame adapted to be detachably secured upon the main frame, carriage-rails forming parts of the subsidiary frame, case-shift mechanism having parts mounted upon the main frame and having other parts mounted for case-shift movement upon the subsidiary frame, said parts on the subsidiary frame being operable by said parts on the main frame and disconnectible therefrom by the detaching of the subsidiary frame, a carriage mounted to travel upon the carriage-rails, a revoluble platen mounted on the carriage to have substantially vertical case-shift movement imparted thereto by the parts of said case-shift mechanism on the subsidiary frame, ribbon-vibrating mechanism mounted upon the main frame and connected to a part of the case-shift mechanism on the main frame to partake of the case-shift movement, a tabulating device having parts movably mounted upon the main frame and having other parts mounted for tabulating movement on the subsidiary frame, the parts of said device on the subsidiary frame being operable by the parts of said device on the main frame and disconnectible therefrom by the detaching of the subsidiary frame, a bell-ringing device mounted upon the main frame, a line-locking device for locking the type-actions also mounted on the main frame, mechanism for operating both the bell-ringing device and the line-locking device having parts mounted upon the main frame and having other parts mounted upon the subsidiary frame, the parts of said operating mechanism on the subsidiary frame being co-operative with the parts of said operating mechanism on the main frame to operate the latter and being disconnectible therefrom by the detaching of the subsidiary frame, a tappet on the carriage to operate the parts of said operating mechanism on the subsidiary frame for ringing the bell as the end of a line is approached and for locking the type-actions at the end of the line, and letter-spacing mechanism for the carriage controlled by the type-actions and having parts mounted upon the main frame and having other parts mounted upon the carriage, the parts of the letter-spacing mechanism on the carriage being disconnectible from the parts of the letter-spacing mechanism on the main frame by the detaching of the subsidiary frame.

44. In a front-strike typewriting machine, in combination, a main frame, type-actions therein, a case-shift device therein, a subsidiary top frame adapted to be detachably secured upon the main frame, carriage-rails forming parts of the subsidiary frame, case-shift mechanism having parts mounted upon the main frame and having other parts mounted for case-shift movement upon the subsidiary frame, said parts on the subsidiary frame being operable by said parts on the main frame and disconnectible therefrom by the detaching of the subsidiary frame, a carriage mounted to travel upon the carriage-rails, a revoluble platen mounted on the carriage to have substantially vertical case-shift movement imparted thereto by the parts of said case-shift mechanism on the subsidiary frame, ribbon-vibrating mechanism mounted upon the main frame and connected to a part of the case-shift mechanism on the main frame to partake of the case-shift movement, a tabulating device having parts movably mounted upon the main frame and having other parts mounted for tabulating movement on the subsidiary frame, the parts of said device on the subsidiary frame being operable by the parts of said device on the main frame and disconnectible therefrom by the detaching of the subsidiary frame, a bell-ringing device mounted upon the main frame, a line-locking device for locking the type-actions also mounted on the main frame, mechanism for operating both the bell-ringing device and the line-locking device having parts mounted upon the main frame and having other parts mounted upon the subsidiary frame, the parts of said operating mechanism on the subsidiary frame being co-operative with the parts of said operating mechanism on the main frame to operate the latter and being disconnectible therefrom by the detaching of the subsidiary frame, and a tappet on the carriage to operate the parts of said operating mechanism on the subsidiary frame for ringing the bell as the end of a line is approached and for locking the type-actions at the end of the line.

ALFRED G. F. KUROWSKI.

Witnesses:
EDITH B. LIBBEY,
CATHERINE A. NEWELL.